(12) United States Patent
Tharanathan et al.

(10) Patent No.: US 8,540,518 B2
(45) Date of Patent: Sep. 24, 2013

(54) TRAINING SYSTEM AND METHOD BASED ON COGNITIVE MODELS

(75) Inventors: Anand Tharanathan, Plymouth, MN (US); Harl Thiruvengada, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 557 days.

(21) Appl. No.: 12/606,808

(22) Filed: Oct. 27, 2009

(65) Prior Publication Data

US 2011/0097697 A1 Apr. 28, 2011

(51) Int. Cl.
G09B 19/00 (2006.01)

(52) U.S. Cl.
USPC .......................................... 434/236; 434/323

(58) Field of Classification Search
USPC .................. 434/236, 323, 350, 322
See application file for complete search history.

(56) References Cited

U.S. PATENT DOCUMENTS

| | | | | |
|---|---|---|---|---|
| 5,230,629 A * | 7/1993 | Buschke | ....................... | 434/236 |
| 5,687,291 A | 11/1997 | Smyth | .............................. | 395/10 |
| 5,749,736 A | 5/1998 | Griswold et al. | ............. | 434/322 |
| 5,797,753 A | 8/1998 | Griswold et al. | ............. | 434/322 |
| 5,911,581 A * | 6/1999 | Reynolds et al. | ............. | 434/236 |
| 6,301,571 B1 | 10/2001 | Tatsuoka | ........................ | 706/45 |
| 6,457,975 B1 * | 10/2002 | Miranda et al. | ................ | 434/236 |
| 6,807,535 B2 | 10/2004 | Goodkovsky | ..................... | 706/3 |
| 6,808,392 B1 * | 10/2004 | Walton | ........................... | 434/236 |
| 6,952,687 B2 | 10/2005 | Andersen et al. | ................ | 706/12 |
| 7,773,097 B2 * | 8/2010 | Merzenich et al. | ............ | 345/619 |
| 2004/0015906 A1 | 1/2004 | Goraya | ........................ | 717/141 |
| 2005/0197992 A1 | 9/2005 | Kipersztok et al. | ............. | 706/50 |
| 2007/0141541 A1 | 6/2007 | Chan et al. | .................... | 434/236 |
| 2008/0027352 A1 | 1/2008 | Chiba et al. | .................... | 600/558 |
| 2008/0091628 A1 | 4/2008 | Srinivasa et al. | ................ | 706/12 |
| 2009/0016600 A1 | 1/2009 | Eaton et al. | ................... | 382/159 |

OTHER PUBLICATIONS

The Hawthorne Effect: a randomized, controlled trial; Bio Med Central; www.biomedcentral.com/1471-2268/7/30 Hawthorne Effect; http://en.wikipedia.org/wiki/Hawthorne_effect.
Baker, D. P. et al., "A Gold Standards Approach to Training Instructors to Evaluate Crew Performance," *NASA/TM-2003-212809* (Dec. 2003), Ames Research Center, Moffett Field, California.
Banbury, S. et al., "FASA: Development and Validation of a Novel Measure to Assess the Effectiveness of Commercial Airline Pilot Situation Awareness Training," *The International Journal of Aviation Psychology* (2007) 17(2):131-152.
Endsley, M. R. et al. (eds.), "Training for Situation Awareness," *Situation Awareness Analysis and Measurement* (2000) Lawrence Erlbaum Associates, Mahwah, NJ, pp. 1-13.

(Continued)

*Primary Examiner* — Peter Egloff
(74) *Attorney, Agent, or Firm* — Kermit D. Lopez; Luis M. Ortiz; Kevin Soules (57) ABSTRACT

A training system and method for measuring, evaluating, and improving the functional efficiency of information processing stages associated with human cognition. Scene dependent and a-priori queries can be created as a part of a training curriculum and an appropriate measuring technique can be executed with respect to each scene to measure the functional efficiency of the cognitive information processing stages. Thereafter, a trainee's response with respect to such queries can be automatically evaluated. Feedback based on the response can then be generated. An adaptive training mechanism can be configured to enhance the functional efficiency of the cognitive information processing stages.

18 Claims, 6 Drawing Sheets

References Cited

OTHER PUBLICATIONS

Nembhard, D. A. et al., "Cross training in production systems with human learning and forgetting," *Workforce Cross Training* (2007) CRC Press, Boca Raton, pp. 111-119.

Thompson, G. et al., "Cognitive-Training Programs for Older Adults: What are They and can They Enhance Mental Fitness?" *Educational Gerontology* (2005) 31:603-626.

* cited by examiner

TRAINING SYSTEM AND METHOD BASED ON COGNITIVE MODELS

TECHNICAL FIELD

Embodiments are related to the field of cognitive information processing and modeling. Embodiments also relate, in general, to the field of computers and similar technologies and, in particular, to software utilized in this field. Embodiments are additionally related to training systems utilized in the context of complex dynamic environments.

BACKGROUND OF THE INVENTION

A cognitive model is a structural organization of the cognitive processes in living beings that enlists how information from the environment is acquired and analyzed and how the decisions are made based on the acquired and analyzed information. Cognitive models include performance models that represent human knowledge and information manipulation processes. Such models attempt to represent and simulate the mental or cognitive processes underlying human behavior. These models are typically based on theories of cognition that describe how knowledge is accessed, represented, and manipulated in human minds. The processing of information in association with human cognition can be categorized into various stages such as, for example, information acquisition, information analysis and decision making, and action selection.

Training systems may be employed in the context of complex dynamic environments such as, for example, in battlefield operations, emergency management, process plant control, firefighting, and so forth. In order to apply cognitive approaches to such training systems, the cognitive information processing stages utilized in this context must attain and maintain a supreme level of functioning in order to perform well in such highly complex and dynamic environments. A decrement in the functional efficiency of processing stages can result in poor decision making, which in turn results in inaccurate and untimely action responses (e.g., on-the-field performance).

The majority of prior art training methodologies do not focus on improving the functional efficiency of each and every stage of the cognitive information processing system in human beings. To do so requires intelligent interventions and succinct feedback techniques. In addition, prior approaches are not sufficiently adaptive to vary the complexity of training scenarios based on the functional efficiency of a trainee's information processing system.

Based on the foregoing, it is believed that a need exists for an improved training system and method for measuring, evaluating, and improving functional efficiency of the information processing stages in human cognition. A need also exists for an improved adaptive training mechanism based on the functional efficiency of the aforementioned information processing stages, as described in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an intelligent and automated training system and method.

It is another aspect of the disclosed embodiments to provide for an improved training system and method for measuring, evaluating, and improving functional efficiency of the information processing stages (e.g., information acquisition, information analysis and decision making, and action selection) in human cognition.

It is a further aspect of the disclosed embodiments to provide for an improved trainee-specific, dynamic, and real-time feedback with respect to the functional efficiency of a trainee's information processing stages.

It is yet another aspect of the disclosed embodiments to provide for an improved adaptive training mechanism based on the functional efficiency of the cognitive information processing stages.

The aforementioned aspects and other objectives and advantages can now be achieved as described herein. A training system and method are disclosed for measuring, evaluating, and improving functional efficiency of the information processing stages associated with human cognition. A scenario that focuses on a specific training objective can be broken down into a set of scenes and dynamically arranged in a logical sequence to provide training for specific high-level skills. Each scene generally follows a script (made up of several tasks) with a predetermined level of task complexity and can be employed to train one or more specific low-level skills that are critical to task accomplishment and contribute to the development of one or more high-level skills. A number of scene-dependent and a-priori queries can be created and an appropriate measuring technique will be executed within each scene to measure the functional efficiency of the cognitive information processing stages. Thereafter, a trainee's responses to the queries are automatically evaluated and feedback is provided, with reference to the responses. Additionally, an adaptive training mechanism can be configured and employed to enhance the functional efficiency of the cognitive information processing stages. A scene with an appropriate level of complexity can also be provided, based on the functional efficiency of the stages of cognitive information processing. When answering queries and receiving feedback, the scene may be "frozen", but not blanked out. In addition, before resuming the training session, the last few seconds of the previous scene can be replayed to enhance the trainee's contextual momentum and reduce the effects of the so-called out-of-the-loop syndrome. Dynamic margins can be implemented to gauge acceptable levels of functional efficiency.

Additionally, answers to queries may be stored in a database and the accuracy and latency in responding to such queries can be recorded. The recorded responses can be evaluated against an ideal case of null errors and null latency. The disclosed feedback mechanism can be designed to benchmark the trainee's performance against an ideal case of null errors and null latency. Also, the training system provides trainee-specific, dynamic, and real-time feedback with respect to the functional efficiency of the trainee's cognitive information processing stages. Such an approach permits the trainee to participate in training sessions of varying complexities and the functional efficiency of each trainee's cognitive information processing stages can be improved.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The disclosed embodiments can be utilized to automatically provide real-time training, performance evaluation, feedback, and dynamic curriculum adjustment in association with a complex dynamic environment such as, for example, battlefield operation, emergency management, process plant control, firefighting, and so forth. The approach described herein can evaluate and provide feedback to improve the functional efficiency of various stages of information processing (e.g., information acquisition, information analysis and decision making, and action selection) in human cognition. The following discussion is intended to provide a brief, general description of suitable computing environments in which the system and method may be implemented. Although not required, the disclosed embodiments may be described in the general context of computer-executable instructions, such as program modules, being executed by a single computer.

Generally, program modules include routines, programs, objects, components, data structures, etc., that perform particular tasks or implement particular abstract data types. Moreover, those skilled in the art will appreciate that the disclosed method and system may be practiced with other computer system configurations such as, for example, handheld devices, multi-processor systems, microprocessor-based or programmable consumer electronics, networked PCs, minicomputers, mainframe computers, and the like.

Figure 1:
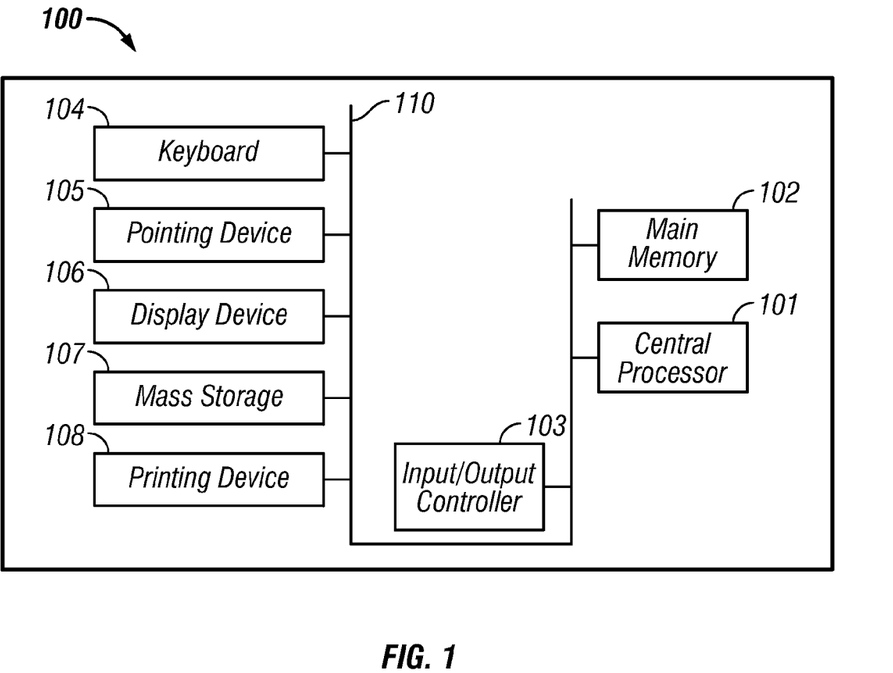
FIG. 1 illustrates a schematic view of a data-processing system in which the disclosed embodiments may be implemented.
Figure 2:
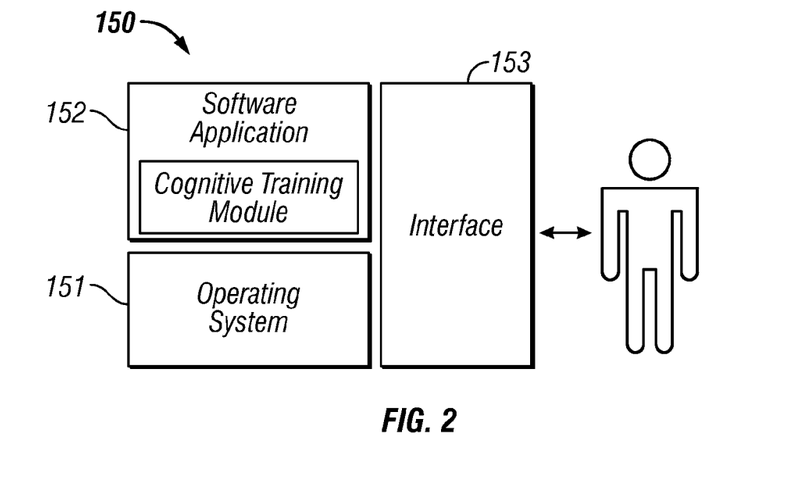
FIG. 2 illustrates a schematic view of a software system including an operating system, application software, and a user interface for carrying out embodiments.
Figure 3:
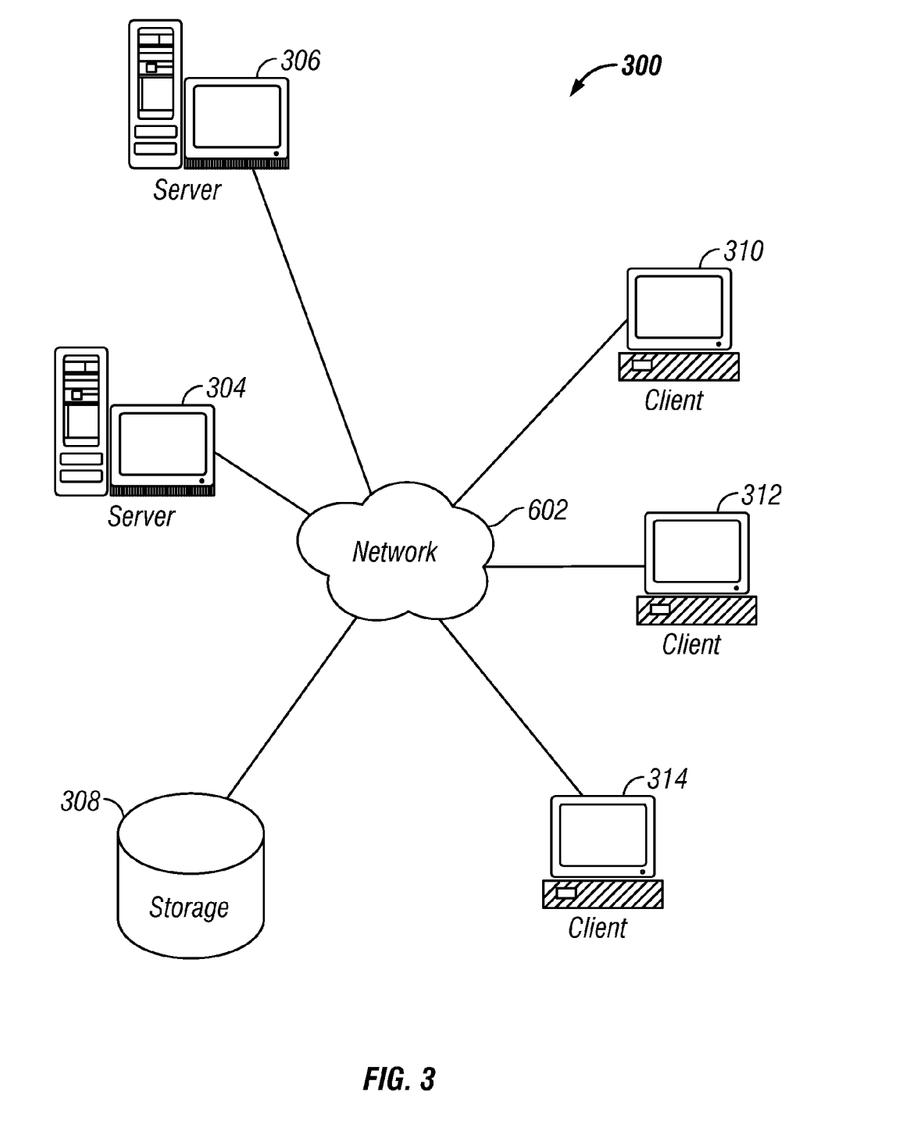
FIG. 3 illustrates a graphical representation of a network of data-processing systems in which aspects of the disclosed embodiments may be implemented.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

As illustrated in FIG. 1, the disclosed embodiments may be implemented in the context of a data-processing system 100 comprising, for example, a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a rendering device 108, for example, may be associated with the data-processing system 100 as desired. As illustrated, the various components of the data-processing system 100 communicate through a system bus 110 or similar architecture. It can be appreciated that the data-processing system 100 may be, in some embodiments, a mobile computing device such as a Smartphone, a laptop computer, an iPhone, etc. In other embodiments, data-processing system 100 may function as a desktop computer, server, and the like, depending upon design considerations.

FIG. 2 illustrates a computer software system 150 for directing the operation of the data-processing system 100 depicted in FIG. 1. Software application 152, stored in main memory 102 and on mass storage 107, includes a kernel or operating system 151 and a shell or interface 153. One or more application programs, such as software application 152, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating module 151 and/ or application module 153.

Note that the term module as utilized herein, may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and includes source code that actually implements the routines in the module. The term module may also simply refer to an application such as a computer program designed to assist in the performance of a specific task such as word processing, accounting, inventory management, etc.

The interface 153, which is preferably a graphical user interface (GUI), also serves to display results, whereupon the user may supply additional inputs or terminate the session. In an embodiment, operating system 151 and interface 153 can be implemented in the context of a "Windows" system. It can be appreciated, of course, that other types of systems and interfaces may be alternatively utilized. For example, rather than a traditional "Windows" system, other operating systems such as, for example, Linux may also be employed with respect to operating system 151 and interface 153. The software application 152 can include a cognitive training module that can be adapted for providing training with an exposure to training scenarios, automated performance evaluation, real-time feedback and training intervention, intelligent adaptation of scene complexity, and dynamic margins for functional efficiency. The software application 152 may constitute a module or a group of modules and may be adapted for evaluating a performance objectively to provide precise and succinct automated real-time feedback. Software application module 152 can also include instructions such as the various operations described herein with respect to the various components and modules described herein such as, for example, the method 600 depicted in FIG. 6 and process 700 illustrated in FIG. 7.

FIG. 3 illustrates a graphical representation of a network of data-processing systems in which aspects of the disclosed embodiments may be implemented. Network data-processing system 300 is a network of computers in which embodiments of the present invention may be implemented. Network data-processing system 300 contains network 602, which is the medium used to provide communications links between various devices and computers connected together within network data-processing apparatus 100. Network 602 may include connections such as wire, wireless communication links, or fiber optic cables.

In the depicted example, server 304 and server 306 connect to network 602 along with storage unit 308. In addition, clients 310, 312, and 314 connect to network 602. These clients 310, 312, and 314 may be, for example, personal computers or network computers. Data-processing system 100 depicted in FIG. 1 can be, for example, a client such as client 310, 312, and/or 314. Alternatively, data-processing system 100 can be implemented as a server such as servers 304 and/or 306, depending upon design considerations.

In the depicted example, server 304 provides data such as boot files, operating system images, and applications to clients 310, 312, and 314. Clients 310, 312, and 314 are clients to server 304 in this example. Network data-processing system 300 may include additional servers, clients, and other devices not shown. Specifically, clients may connect to any member of a network of servers which provide equivalent content.

In the depicted example, network data-processing system 300 is the Internet with network 602 representing a worldwide collection of networks and gateways that use particular computer communication network protocols to communicate with one another. At the heart of the Internet is a backbone of high-speed data communication lines between major nodes or host computers, consisting of thousands of commercial, government, educational, and other computer systems that route data and messages. Of course, network data-processing system 300 also may be implemented as a number of different types of networks such as, for example, an intranet, a local area network (LAN), or a wide area network (WAN). FIG. 2 is intended as an example and not as an architectural limitation for different embodiments of the present invention.

The following description is presented with respect to embodiments of the present invention, which can be embodied in the context of a data-processing system such as data-processing system 100 and computer software system 150 depicted respectively FIGS. 1-3. The present invention, however, is not limited to any particular application or any particular environment. Instead, those skilled in the art will find that the system and method of the present invention may be advantageously applied to a variety of system and application software, including database management systems, word processors, and the like. Moreover, the present invention may be embodied utilizing a variety of different platforms, including Macintosh, UNIX, LINUX, and the like.

Figure 4:
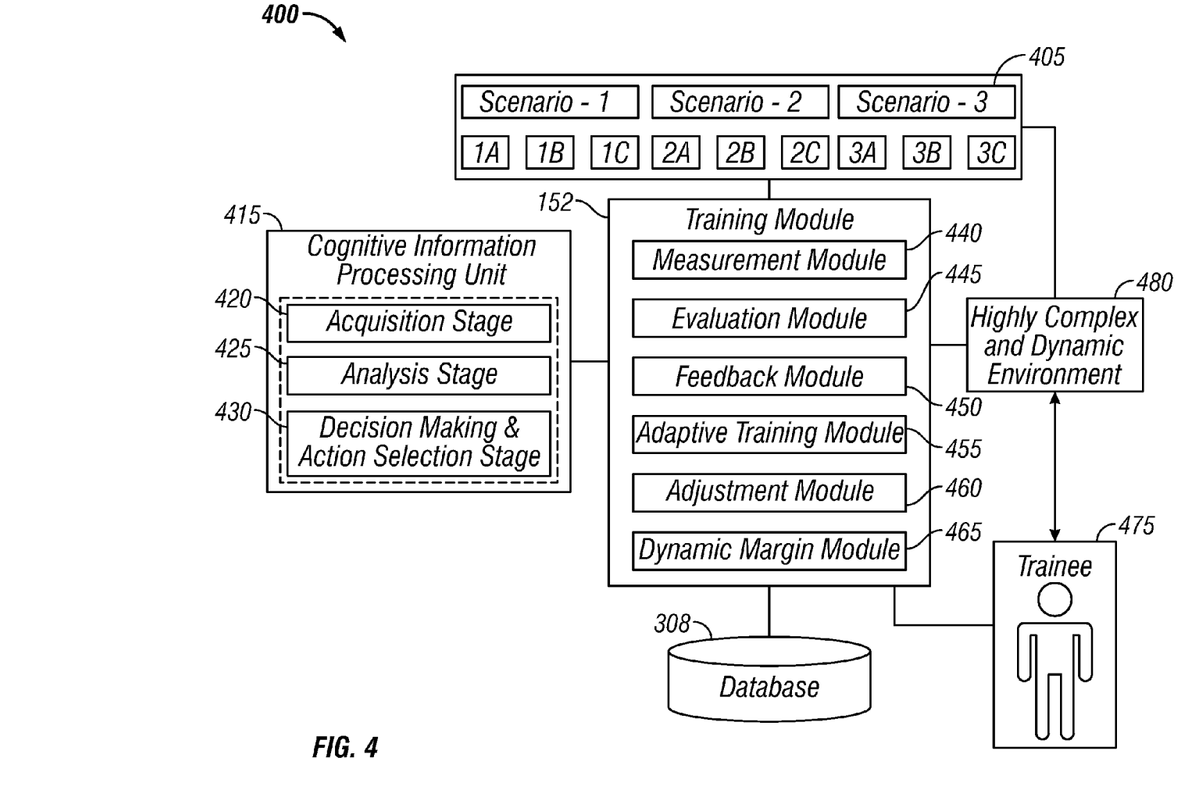
FIG. 4 illustrates a block diagram of a training system based on a cognitive model, in accordance with the disclosed embodiments.

FIG. 4 illustrates a block diagram of a training system 400 based on a cognitive model, in accordance with the disclosed embodiments. The training system 400 generally includes a cognitive information processing unit 415 and a training module 152 associated with a complex dynamic environment 480. A number of training scenarios 405, each associated with a number of scenes, such as scene 1A, scene 1B, and scene 1C that vary in skill and complexity, can be configured to train different low level skills that build up towards a high level skill associated with the complex dynamic environment 480.

The cognitive information processing unit 415 and the training module 152 can interface with a complex dynamic environment 480 (e.g., a gaming/simulation environment) through a network connection via a network such as, for example, the network 300 depicted in FIG. 3. The cognitive information processing unit 415 may be divided into three or more stages such as, for example, an information acquisition stage 420, an information analysis stage 425, and a decision making and action selection stage 430. The cognitive information processing unit 415 focuses on different aspects of instruction and how those aspects can either facilitate or hinder learning and memory. The cognitive information processing unit 415 emphasizes utilizing strategies that focus the trainee's attention, promote encoding and retrieval, and provide for meaningful, effective practice across learning environments. A trainee 475 interacts with a gaming engine and appropriate data and a control message can be sent in standard message format between the training module 152 and the complex dynamic environment 480.

The training module 152 generally includes a measurement module 440, an evaluation module 445, a feedback module 450, an adaptive training module 455, an adjustment module 460, and a dynamic margin module 465.

The measurement module 440 can be programmed to measure the state of functioning or performance of the trainee 475 based on the cognitive information processing stages 420, 425, and 430. The evaluation module 445 can be programmed to evaluate in real-time the functional efficiency of the trainee's three stages 420, 425, and 430 of cognitive information processing unit 415. The trainee's performance metrics can be stored in the persistent database 308 for future review and analysis.

The feedback module 450 can be programmed to provide trainee-specific, real-time, and dynamic feedback with respect to the functional efficiency of the trainee's cognitive information processing stages 420, 425, and 430. The feedback can be provided to the trainee 475 to identify the performance of the trainee 475. The adaptive training module 455 can be programmed to provide trainee-specific, automatic, on-the-fly training on methods, and strategies to improve the functional efficiency of the cognitive information processing stages 420, 425, and 430.

The adjustment module 460 can be programmed to dynamically and intelligently vary the complexity of a training scenario based on the functional-efficiency of the cognitive information processing stages 420, 425, and 430. The dynamic margin module 465 can be programmed to dynamically readjust the margins for acceptable level of functional efficiency. The training system 400 permits the trainee 475 to improve performance through targeted feedback.

Figure 5:
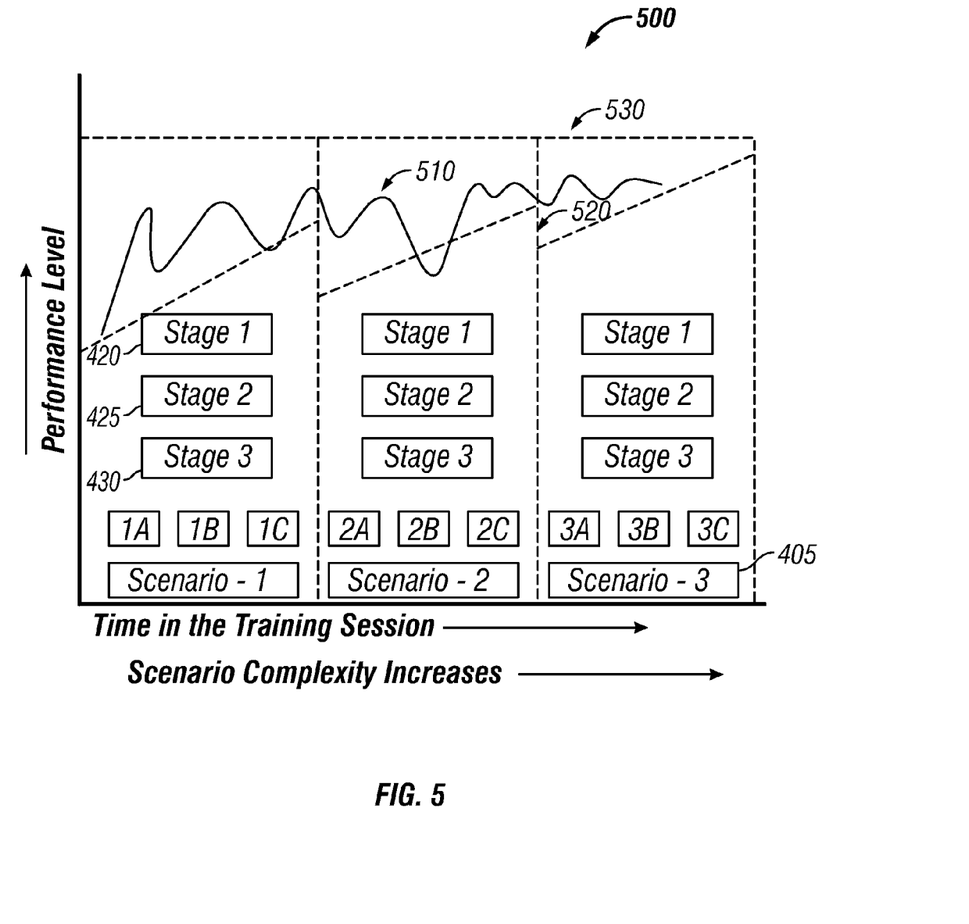
FIG. 5 illustrates a graphical representation of dynamic margins while traversing through training scenarios, in accordance with the disclosed embodiments.

FIG. 5 illustrates a graphical representation 500 of dynamic margins 520 while traversing through the training scenarios 405, in accordance with the disclosed embodiments. Note that in FIGS. 1-7, identical or similar blocks are generally indicated by identical reference numerals. The embodiment that is presently disclosed is intended to serve as an illustrative example of the present invention. It should be noted that the evaluation process and evaluation criteria can be modified in numerous ways. Initially, a list of scenarios such as, for example, scenario 1, scenario 2, and scenario 3 can be created, as illustrated at block 405. The scenario 1 can be broken down into a set of scenes that are dynamically arranged in a logical sequence to train for a specific skills-set. Each scenario comprises a group of scenes such as scene 1A, scene 1B, and scene 1C that are comparable in complexity and are designed to train different low level skills that build up towards the high level skill.

The scene 1A, scene 1B, and scene 1C associated with the scenario 1 can provide a task to the trainee 475 to train for the high level skill. The performance of the trainee 475 can be measured with respect to latency and accuracy of actions. A measuring technique that comprises of a number of scene-dependent and a-priori queries can be created and executed in order to measure the functional efficiency of the cognitive information processing stages 420, 425, and 430. The trainee's responses with respect to the queries can be evaluated automatically and the feedback associated with the performance of each scene and necessary training can be provided to improve the targeted skill. The scene replay can be performed to decrease disruption in contextual momentum. The complexity of the training scenarios 405 can be varied depending on the functional efficiency of the cognitive information processing stages 420, 425, and 430.

If the trainee has acquired the targeted skill by executing scene 1A, the trainee 475 can be permitted to execute scene 1B to acquire the next targeted skill. Thereafter, the trainee can start executing the next scenario (scenario 2) that has a higher level of complexity. The dynamic margins for the cognitive performance assessment and categorization, and the actual trainee performance are indicated by arrows 520 and 510, respectively. The evaluation of the functional efficiency of the trainee's cognitive information processing stages 420, 425, and 430 can be performed in real-time. The cognitive information processing unit 415 can be designed to vary the complexity of the training scenarios dynamically and intelligently depending on the functional efficiency of each trainee's cognitive information processing stages. In addition, the proposed approach dynamically readjusts the margins 520 for acceptable level of functional efficiency.

Figure 6:
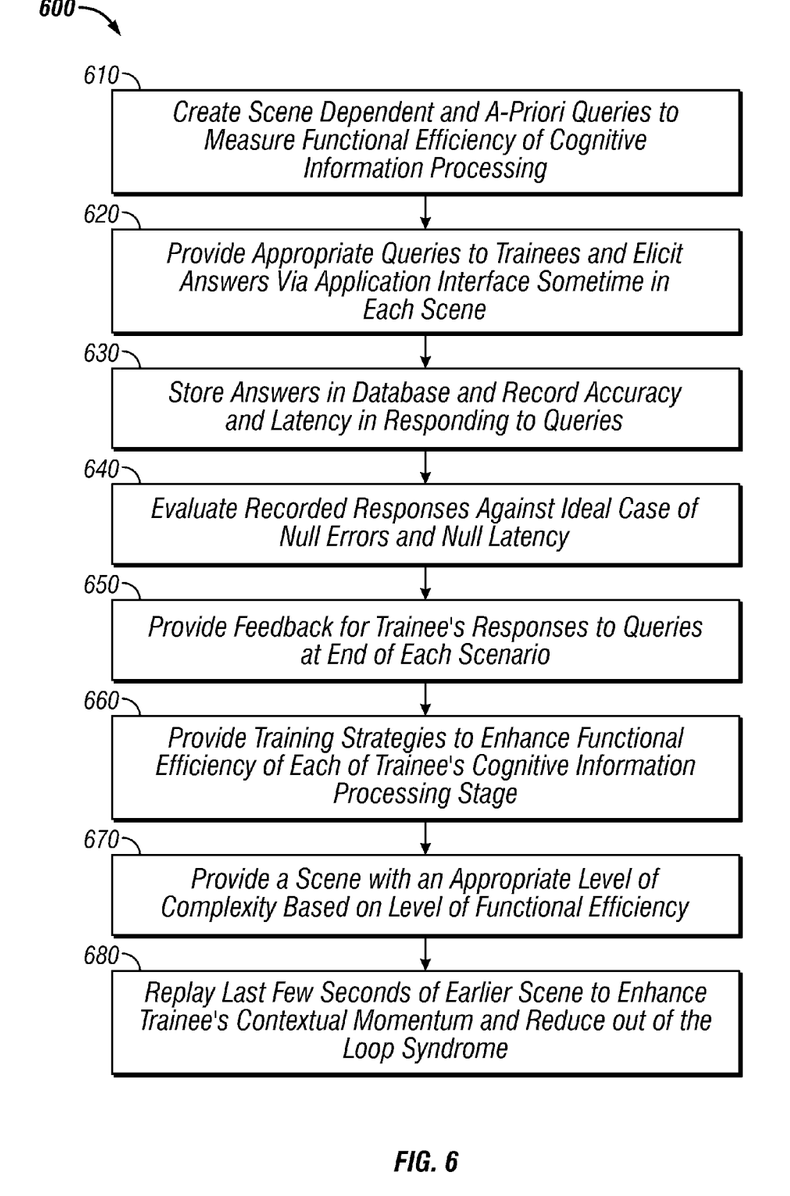
FIG. 6 illustrates a high level flow chart of operation illustrating logical operational steps of a method for providing training based on functional efficiency of information processing stages in human cognition, in accordance with the disclosed embodiments.

FIG. 6 illustrates a high level flow chart of operation illustrating logical operational steps of a method 600 for providing training based on functional efficiency of cognitive information processing stages 420, 425, and 430, in accordance with the disclosed embodiments. Note that the method 600 can be implemented in the context of a computer-usable medium that contains a program product. Note that the method 600 depicted in FIG. 6 and the process 700 of FIG. 7 may be provided as a module that includes instructions with respect to each of the steps outlined in FIG. 6. The method(s) 600/700 may be implemented in the context of a computer-usable medium containing a program product (e.g., software application, software modules, etc).

Note that programs defining functions with respect to the disclosed embodiments may be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media such as computer and telephone networks including, for example, Ethernet, the Internet, wireless networks, and other networked systems. Thus, the method 600 and the process 700 described herein can be deployed as process software in the context of a computer system or data-processing system as that depicted in FIGS. 1-3.

The scene dependent and a-priori queries can be created to measure the functional efficiency of the cognitive information processing stages 420, 425 and 430, as depicted at block 610. Thereafter, appropriate queries can be provided to the trainees 475 and answers can be elicited via an application interface after sometime in each scene, as illustrated at block 620. Note that application interface can be implemented utilizing a GUI such as the GUI 153 depicted in FIG. 2 and can be provided by a module such as, for example, module 152. The application interface can be displayed via a display device 106 as depicted in FIG. 1 and implemented via the GUI 153. The answers can be stored in the database 308 and accuracy and latency in responding to the queries can also be recorded, as indicated at block 630.

The recorded responses can then be evaluated against an ideal case of null errors and null latency, as illustrated at block 640. The feedback for the trainee's responses to the queries can be provided at the end of each scenario 405, as indicated at block 650. The feedback mechanism can be designed to benchmark the trainee's performance against the ideal case of null errors and null latency. In addition, the results can be categorized as the functional efficiency of the trainee's information processing stages 420, 425, and 430. The training strategies can be provided to enhance the functional efficiency of each of the trainee's cognitive information processing stages 420, 425, and 430, as depicted at block 660. Thereafter, each trainee can be provided a scene with an appropriate level of complexity based on the level of functional efficiency, as indicated at block 670. The last few seconds of the earlier scene can be replayed to enhance the trainee's contextual momentum and reduce the out-of-the-loop syndrome, as illustrated at block 680.

Figure 7:
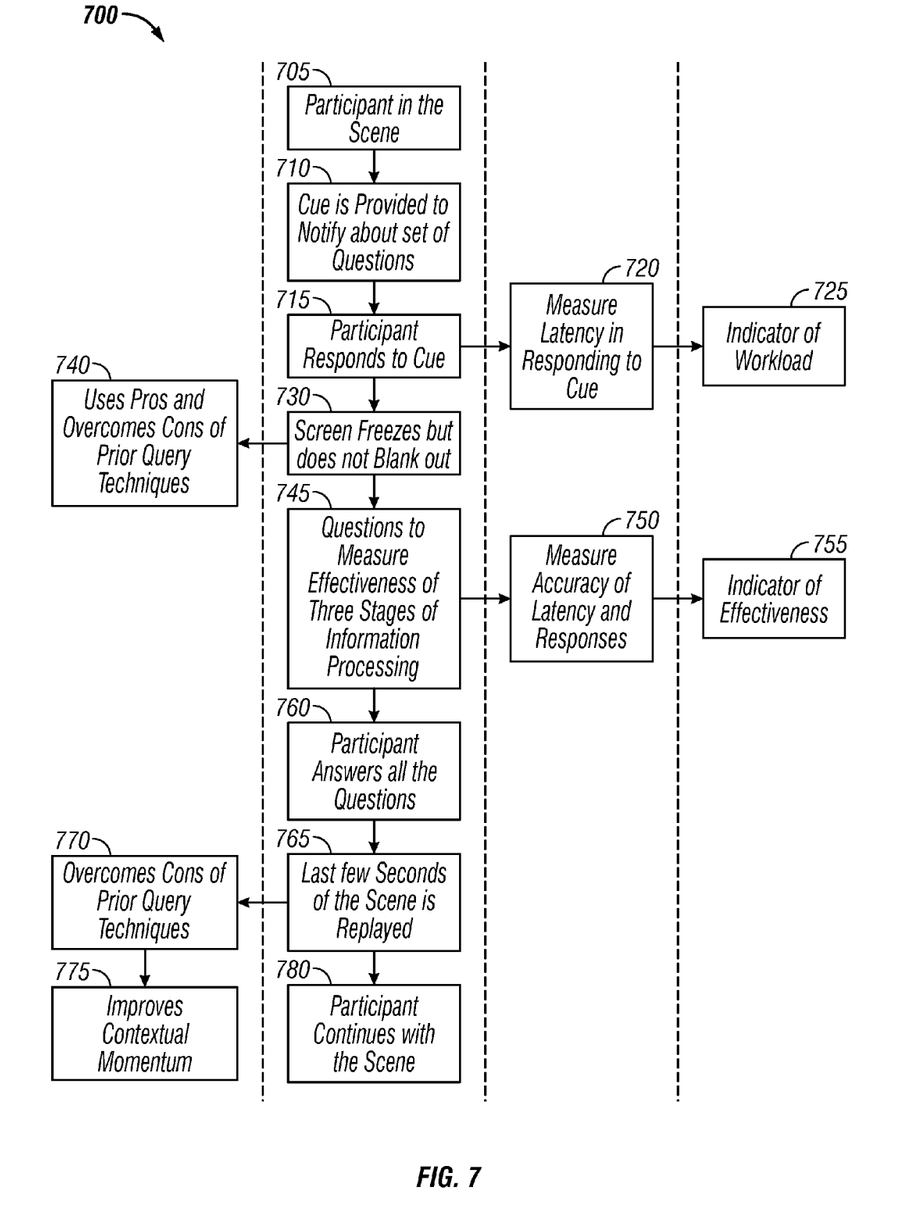
FIG. 7 illustrates a process diagram for measuring, evaluating, and improving the functional efficiency of the cognitive information processing stages, in accordance with the disclosed embodiments.

FIG. 7 illustrates a diagram depicting a process 700 associated with the training system 400 for measuring, evaluating, and improving functional efficiency of the cognitive information processing stages 420, 425, and 430, in accordance with the disclosed embodiments. A participant can be presented with a training scene via an application interface such as, for example, the GUI 153 depicted in FIG. 2, as depicted at block 705. A cue may then be generated, as indicated at block 710, to provide notification regarding a particular set of questions. Thereafter, the participant can respond to the cue, as illustrated at block 715. The latency in responding to the cue and the workload can then be measured, as depicted at blocks 720 and 725. The screen associated with the application interface then "freezes" without going blank as illustrated at block 730.

The system 400 builds on the "pros" and overcomes the "cons" of the prior query techniques while also generating questions that assist in measuring the effectiveness of the cognitive information processing stages 420, 425, and 430, as depicted at blocks 740 and 745. The accuracy and latency of the responses can then be measured and the effectiveness indicated, as depicted respectively at blocks 750 and 755. The aforementioned questions can be answered by the participants, as indicated at block 760. Thereafter, the last few seconds of the scene can be replayed, as illustrated at block 765. Such an operation permits the "cons" of prior query techniques to be overcome and therefore improves contextual momentum, as illustrated at blocks 770 and 775. The participant may continue with the scene, as depicted at block 780.

The complexity of the training scenarios 405 varies depending on the functional efficiency of each trainee's cognitive information processing stages 420, 425, and 430. Also, the training system 400 provides trainee-specific, dynamic, and real-time feedback on the functional efficiency of the trainee's cognitive information processing stages 420, 425, and 430. Such an approach permits the trainee 475 to participate in training sessions of varying complexities and the functional efficiency of the trainee's cognitive information processing stages 420, 425, and 430 can be improved. The trainee 475 can be much better prepared for a domain-specific task with a relatively less negative impact from the so called Hawthorne effect, which is a form of reactivity whereby subjects improve an aspect of their behavior being experimentally measured simply in response to the fact that they are being studied and not in response to any particular experimental manipulation.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. An automated training method, said method comprising: measuring a performance of a trainee with respect to a plurality of cognitive information processing stages and in association with a simulation environment and configuring at least one scene, wherein a-priori generated queries and scene dependent queries that are relevant to a current task are dynamically presented to measure said functional efficiency of said plurality of cognitive information processing stages by executing a non-transitory computer readable program instruction in a data processing apparatus, in order to derive performance data and thereafter evaluate a functional efficiency of said plurality of cognitive information processing stages in real-time based on an action of said trainee;

automatically providing real-time feedback to said trainee based on said performance data with respect to said plurality of cognitive information processing stage by executing a non-transitory computer readable program instruction in a data processing apparatus; and dynamically generating at least one scene among a plurality of scenes with a level of complexity based on said measured performance data indicative of said functional efficiency of said plurality of cognitive information processing stages, wherein said at least one generated scene is configured to train a plurality of low level skills necessary for building toward a higher level skill, by executing a non-transitory computer readable program instruction in a data processing apparatus.

2. The method of claim 1 further comprising enhancing said functional efficiency of said plurality of cognitive information processing stages utilizing an adaptive training mechanism in order to dynamically generate said at least one scene among said plurality of scenes with said level of complexity based on said functional efficiency of said plurality of said cognitive information processing by executing a non-transitory computer readable program instruction in a data processing apparatus.

3. The method of claim 1 further comprising configuring said plurality of scenes to include said at least one scene that varies in skill type and complexity in order to train said trainee to achieve a high level skill.

4. The method of claim 3 further comprising integrating said plurality of scenes in a logical sequence to create a scenario for training said trainee to achieve said high level skill.

5. The method of claim 1 further comprising dynamic margins to assess a level of said functional efficiency with reference to an acceptable level.

6. The method of claim 1 further comprising storing a response to said a-priori generated queries in a database to record accuracy and latency associated with said response for future analysis by executing a non-transitory computer readable program instruction in a data processing apparatus.

7. The method of claim 1 further comprising evaluating said recorded response with respect to an ideal case of null error and null latency.

8. The method of claim 7 wherein providing an automated real-time feedback based on said performance data, further comprises:
configuring said automated real-time feedback to benchmark said trainee performance against said ideal case of null error and null latency by executing a non-transitory computer readable program instruction in a data processing apparatus.

9. The method of claim 1 further comprising configuring said adaptive training mechanism to vary a complexity of said plurality of scenes depending on said functional efficiency of said cognitive information processing stages.

10. The method of claim 1 wherein said plurality of cognitive information processing stages includes at least one of the following stages:
an information acquisition stage;
an information analysis stage; and
a decision making and action selection stage.

11. An automated training system, said system comprising:
a processor;
a data bus coupled to said processor; and
a computer-usable medium embodying computer code, said computer-usable medium being coupled to said data bus, said computer program code comprising instructions executable by said processor and configured for:
measuring a performance of a trainee with respect to a plurality of cognitive information processing stages and in association with a simulation environment in order to derive performance data and thereafter evaluate a functional efficiency of said plurality of cognitive information processing stages in real-time based an action of said trainee;
modifying at least one scene, wherein a-priori generated queries and scene dependent queries that are relevant to a current task are dynamically presented to measure said functional efficiency of said plurality of cognitive information processing stages;
automatically providing real-time feedback to said trainee based on said performance data with respect to said plurality of cognitive information processing stages; and
dynamically generating at least one scene among a plurality of scenes with a level of complexity based on said measured performance data indicative of said functional efficiency of said plurality of cognitive information processing stages, wherein said at least one generated scene is configured to train a plurality of low level skills necessary for building toward a higher level skill.

12. The system of claim 11 wherein said instructions are further configured for:
enhancing said functional efficiency of said plurality of cognitive information processing stages utilizing an adaptive training mechanism in order to dynamically generate said at least one scene among said plurality of scenes with said level of complexity based on said functional efficiency of said plurality of said cognitive information processing;
configuring said plurality of scenes to include said at least one scene that varies in skill and complexity in order to train said trainee to achieve a high level skill; and integrating said plurality of scenes in a logical sequence to create a scenario for training said trainee to achieve said high level skill.

13. The system of claim 11 wherein said instructions are further configured for:
storing a response to said a-priori generated queries in a database to record accuracy and latency associated with said response for future analysis; and
evaluating said recorded response with respect to an ideal case of null error and null latency.

14. The system of claim 11 wherein said instructions for providing an automated real-time feedback based on said performance data are further configured for:
modifying said automated real-time feedback to benchmark said trainee performance against said ideal case of null error and null latency.

15. The system of claim 11 wherein said instructions are further configured for modifying said adaptive training mechanism to vary a complexity of said plurality of scenes depending on said functional efficiency of said cognitive information processing stages.

16. A non-transitory computer-usable medium for automated training, said computer-usable medium embodying computer program code, said computer program code comprising computer executable instructions configured for:
measuring a performance of a trainee with respect to a plurality of cognitive information processing stages and in association with a simulation environment in order to derive performance data and thereafter evaluate a functional efficiency of said plurality of cognitive information processing stages in real-time based an action of said trainee;
modifying at least one scene, wherein a-priori generated queries and scene dependent queries that are relevant to a current task are dynamically presented to measure said functional efficiency of said plurality of cognitive information processing stages;
automatically providing real-time feedback to said trainee based on said performance data with respect to said plurality of cognitive information processing stages; and
dynamically generating at least one scene among a plurality of scenes with a level of complexity based on said measured performance data indicative of said functional efficiency of said plurality of cognitive information processing stages, wherein said at least one generated scene is configured to train a plurality of low level skills necessary for building toward a higher level skill.

17. The computer-usable medium of claim 16 wherein said embodied computer program code further comprises computer executable instructions configured for enhancing said functional efficiency of said plurality of cognitive information processing stages utilizing an adaptive training mechanism in order to dynamically generate said at least one scene among said plurality of scenes with said level of complexity based on said functional efficiency of said plurality of said cognitive information processing.

18. The computer-usable medium of claim 16 wherein said embodied computer program code further comprises computer executable instructions configured for modifying said plurality of scenes to include said at least one scene that varies in skill type and complexity in order to train said trainee to achieve a high level skill.

* * * * *